US009737939B2

(12) United States Patent
Norstedt et al.

(10) Patent No.: US 9,737,939 B2
(45) Date of Patent: Aug. 22, 2017

(54) TOOL FOR CHIP REMOVING MACHINING AS WELL AS A CUTTING EDGE EXCHANGE MECHANISM THEREFOR

(71) Applicant: SANDVIK INTELLECTUAL PROPERTY AB, Sandviken (SE)

(72) Inventors: Anders Norstedt, Sandviken (SE); Ulrik Sunnvius, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 15/303,351

(22) PCT Filed: Feb. 18, 2015

(86) PCT No.: PCT/EP2015/053365
§ 371 (c)(1),
(2) Date: Oct. 11, 2016

(87) PCT Pub. No.: WO2015/158448
PCT Pub. Date: Oct. 22, 2015

(65) Prior Publication Data
US 2017/0028483 A1    Feb. 2, 2017

(30) Foreign Application Priority Data

Apr. 16, 2014    (EP) .................................. 14164902

(51) Int. Cl.
*B23C 5/24*    (2006.01)
*B23C 5/22*    (2006.01)
*B23C 5/06*    (2006.01)

(52) U.S. Cl.
CPC .............. *B23C 5/2427* (2013.01); *B23C 5/06* (2013.01); *B23C 5/2221* (2013.01);
(Continued)

(58) Field of Classification Search
CPC .......... B23B 2200/168; B23B 2205/18; B23C 2200/168; B23C 2210/161;
(Continued)

(56) References Cited

U.S. PATENT DOCUMENTS 4,024,777 A    5/1977    Fogarty
4,541,165 A    9/1985    Sawai et al.

FOREIGN PATENT DOCUMENTS

EP    1013365 A1    6/2000
JP    H04176505 A    6/1992

*Primary Examiner* — Sunil K Singh
*Assistant Examiner* — Alan Snyder
(74) *Attorney, Agent, or Firm* — Corinne R. Gorski

(57) ABSTRACT

A tool for a chip removing machining includes a basic body and a replaceable cutting insert, which is indexable by a cutting edge exchange mechanism. The cutting edge mechanism includes an ejector, which in a front part has an attachment for the cutting insert and interacts with a device for transforming a rectilinear, axial projection of the ejector into a simultaneous turning of the same. The cutting edge exchange mechanism includes a stop collar, which is fixedly anchored in relation to the basic body, and through which the ejector is movable back and forth and a carrier included in a rear part of the ejector. In addition, between the carrier and the stop collar, there is arranged a mechanical compression spring, which spaces the carrier from the stop collar. In addition, an autonomous cutting edge exchange mechanism is disclosed.

8 Claims, 10 Drawing Sheets

(52) U.S. Cl.
CPC ..... *B23B 2205/18* (2013.01); *B23C 2200/168* (2013.01); *B23C 2200/363* (2013.01); *B23C 2210/161* (2013.01); *B23C 2210/163* (2013.01)

(58) Field of Classification Search
CPC ............ B23C 2210/163; B23C 5/2468; B23C 5/2208; B23C 5/2221; B23C 5/242; B23C 5/08
USPC .......................................................... 483/21
See application file for complete search history.

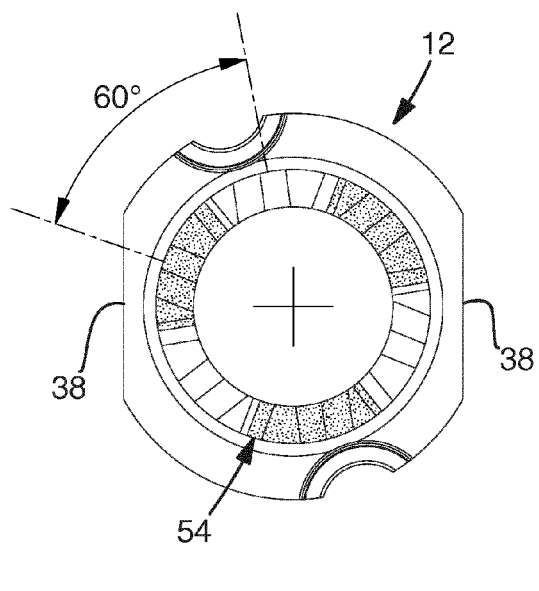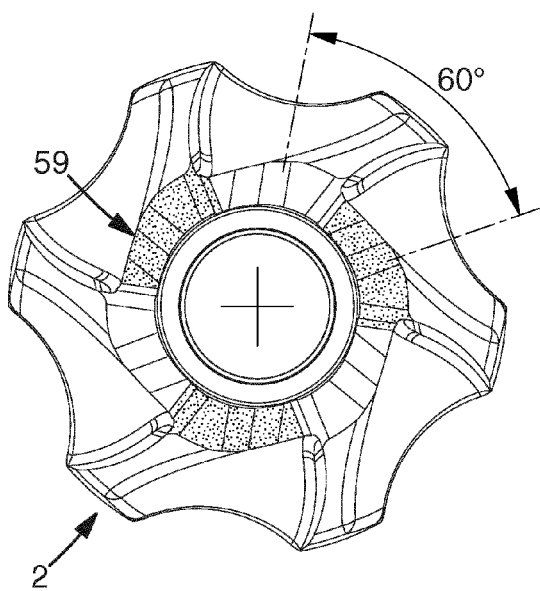
Fig 12    Fig 13
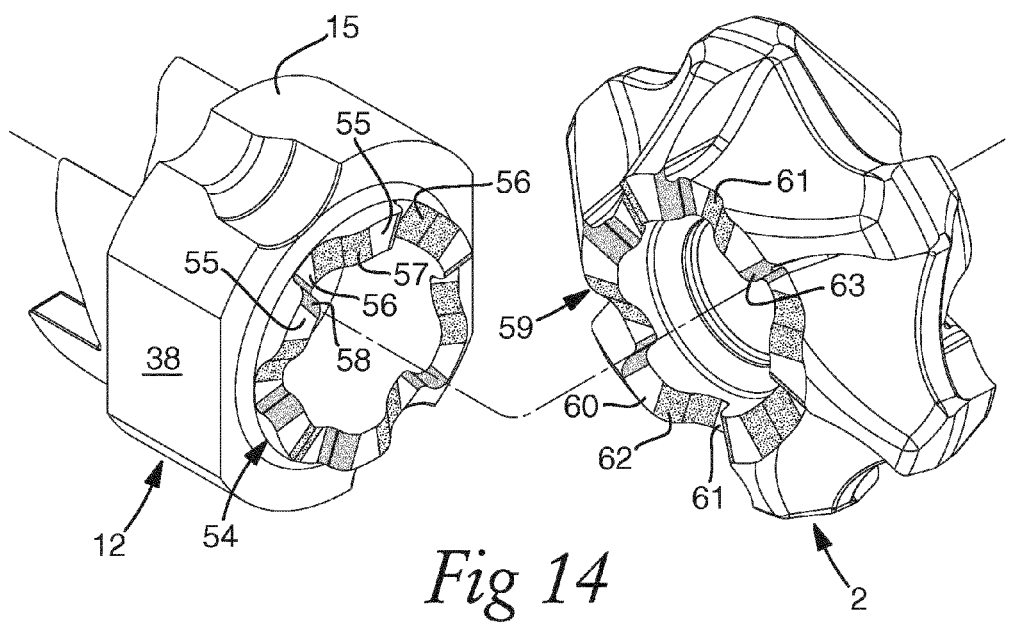
Fig 14

TOOL FOR CHIP REMOVING MACHINING AS WELL AS A CUTTING EDGE EXCHANGE MECHANISM THEREFOR

RELATED APPLICATION DATA

This application is a §371 National Stage Application of PCT International Application No. PCT/EP2015/053365 filed Feb. 18, 2015 claiming priority of EP Application No. 14164902.0, filed Apr. 16, 2014.

TECHNICAL FIELD

The present disclosure relates to a tool arranged for chip removing machining and of the type that includes a basic body and a replaceable cutting insert, which is indexable by means of a cutting edge exchange mechanism, in which there is included a long narrow ejector, which in a front part has an attachment for the cutting insert and interacts with turning means for transforming a rectilinear, axial movement into a simultaneous turning of the same.

The present disclosure also relates to an autonomous cutting edge exchange mechanism as such.

BACKGROUND

A cutting tool of the type initially mentioned is previously known by U.S. Pat. No. 4,024,777. More precisely, this document describes and exemplifies a turning tool of the type that, in addition to a holder or bar, includes an indexable cutting insert having a parallelepipedic shape, which has four alternately individually usable cutting edges, and which can be rotationally secured in a seat with two side support surfaces perpendicular to each other. This cutting insert may be detachably mounted in an attachment on a front part of a shaft included in a device, and which turns in connection with the same being rectilinearly thrust outward to a position in which the cutting insert has left the seat. In a rear part, the shaft includes a piston, which is sealed against the inside of a cylindrical boring, in which the piston is movable back and forth. In other words, the boring forms a pressure fluid cylinder, which is divided into a plus chamber and a minus chamber to and from which a pressure fluid (e.g., liquid or gas) can be supplied and evacuated, respectively, for either thrusting out the cutting insert and indexing the same, or bringing the same back to the operative position in the seat. Turning of the shaft is provided for by a fixed guide pin, which projects into the boring and the piston and engages the gaps between a number of front teeth having obliquely cut end edge surfaces, with which obliquely cut edge surfaces of a rear set of teeth included in the same piston interact.

A disadvantage of this known tool is that the clamping of the cutting insert in the appurtenant seat is unreliable and it is a problem to accommodate tolerances for the fitting of the cutting insert into the seat. Another disadvantage is that the tool is complex and expensive to manufacture.

SUMMARY

The present disclosure aims at obviating the above-mentioned disadvantages of the tool known by U.S. Pat. No. 4,024,777 providing, on one hand, an improved tool of the kind in question, and, on the other hand, a cutting edge exchange mechanism as such. Thus, the present disclosure provides a tool formed with a cutting edge exchange mechanism, and an autonomous cutting edge exchange mechanism, which guarantees a simple and quick indexing of the cutting insert, and a long-term reliable fixation of the cutting insert in its operative state. In addition, the disclosure aims at allowing use of a cutting edge exchange mechanism not only in stationary tools, such as turning tools, but also in movable ones, in particular rotatable milling tools.

The cutting edge exchange mechanism includes a stop collar, which is fixedly anchorable in relation to the basic body and through which the ejector is movable back and forth, as well as a carrier included in a rear part of the ejector, between the carrier and the stop collar, there being arranged a compressible force generator, which aims at distancing the first-mentioned one from the last-mentioned one. Due to the cutting edge exchange mechanism having been provided with a force generator, which is formed in such a way that it presses apart the carrier from the stop collar, the force generator will press the cutting insert situated in its outer end toward the stop collar so that the cutting insert reliably and distinctly can be pushed against a seat of the basic body arranged therefor. Due to the force generator being of the compressible type, a simple maneuvering is allowed by the fact that only one compressing power needs to be provided and its function becomes reliable. By thrusting out the ejector against the action of the spring, indexing as well as replacement of the individual cutting insert can be carried out in a simple, convenient, and fast way.

Thus, the disclosure is based on the idea of forming a cutting tool of the type that includes a cutting edge exchange mechanism in such a way that indexing and/or replacement of one or more cutting inserts can be carried out fast and easily, at the same time as the fixation of the cutting insert in the operative position becomes reliable. To that extent, the cutting edge exchange mechanism uses a compression spring or another compressible force supplying member, e.g., a gas spring, which by great spring force can hold the ejector retracted in a position in which the cutting insert distinctly is fixedly pressed in an appurtenant seat. Until the cutting insert is indexed (or replaced), a suitable accessory, e.g., a mandrel, may be utilized for overcoming the spring force and thrusting out the ejector during simultaneous turning of the same toward a new index position for the cutting insert.

The task to carry out a turning motion along an arc angle determined by the number of cutting edges per cutting insert (e.g., 60° for six-edged cutting inserts) can be provided in many different ways. In one embodiment, the task is divided between, on one hand, sets of obliquely cut teeth of the proper cutting edge exchange mechanism, and, on the other hand, sets of male-like cogs in a seat and of the cutting insert. By forming gaps between such, interacting cogs having, on one hand, a sloping flank surface, and, on the other hand, a steeply rising flank surface, a final turning of the cutting insert and the ejector can be carried out by the sloping flank surfaces sliding in relation to each other until a pair of steeply rising flank surfaces are urged against each other. In particular if the tool is a milling cutter (or another rotatable tool), each one of a plurality of cutting inserts can be mounted on each an ejector, which in one and the same single operation can be thrust out and simultaneously turned in order to assume a new index position.

In contrast, in the tool known by U.S. Pat. No. 4,024,777, a hydraulic or gas pressure has to be continuously maintained in the chamber that holds the ejector inserted in the bore, when the cutting insert is operative. If leakage would arise somewhere in the fluid duct system between a pump and the plus chamber of the cylinder (or in the appurtenant control system), the cutting insert may come loose and cause damage to not only the workpiece that is turned, but also in the environment of the machine. Furthermore, the known tool is considerably more complicated and expensive to manufacture than the tool according to the present disclosure, not the least being a consequence of intricate ducts having to be drilled in the tool body and be connected to an external, stationary pump.

Moreover, the known device in practice is only suitable for use in stationary tools, such as turning tools, but not in such rotatable tools as milling cutters. In addition, it should be pointed out that the tolerance chain between the locking pin that determines the turning position of the cutting insert, and the side support surfaces that are included in the seat of the cutting insert, becomes long and awkward, involving that the fitting in of the cutting insert in the seat runs the risk of becoming imprecise.

In one embodiment, the stop collar as well as the carrier is included in a pair of sleeves, which also include cylinder walls, which are radially separated from the ejector, the force generator being placed between the ejector and the cylinder walls, besides which the turning means for turning the ejector during its rectilinear projection are included in the cylinder walls of the sleeves. In such a way, the turning device requisite for the turning of the ejector are integrated with walls, which are simple to manufacture and which in a reliable way retain the spring in desired position.

In the above-mentioned embodiment, the turning device may be two sets of pointed teeth pointing at each other, which are formed in the cylinder walls and each one of which includes an obliquely cut edge surface, which extends between a point and a tooth gap bottom. In such a way, the manufacture of the cutting edge exchange mechanism is facilitated.

In a further embodiment, the stop collar, included in the cutting edge exchange mechanism, includes a seat, intended for the receipt of the cutting insert, in the form of a gear rim having tangentially spaced-apart cogs, which include a shallowly tilted flank surface as well as a steeply tilted flank surface, which together delimit an individual gash, besides which the cutting insert includes a second gear rim having analogous cogs arranged to engage the gashes of the first gear rim. In such a way, an efficient means is obtained in a simple way for completing a turning motion provided by the teeth so that the teeth are brought into a position in which the points of the teeth are located overlapping each other in order to be able to commence a new turning motion.

In one embodiment, the force generator is a compression spring, such as, for instance, a helical spring. This is advantageously a simple and reliable component.

In one embodiment, the cutting edge exchange mechanism is partly arranged in a bore in the tool body, at least the force generator being positioned in the bore. In this way, it is possible to protect the force generator from chips inside the basic body.

BRIEF DESCRIPTION OF THE APPENDED DRAWINGS

In the drawings:

FIG. 12 is an end view taken along line XII-XII in FIG. 7.

FIG. 13 is an end view taken along line XIII-XIII of the cutting insert in FIG. 8.

FIG. 14 is a perspective exploded view, enlarged in relation to FIG. 5, showing how a series of cogs included in the seat of the outer sleeve interacts with an analogous set of cogs along a back side of the cutting insert.

FIGS. 20*a*-20*f* are a series of pictures showing the function of the cutting edge exchange mechanism at different stages during the indexing of a cutting insert.

Figure 21:
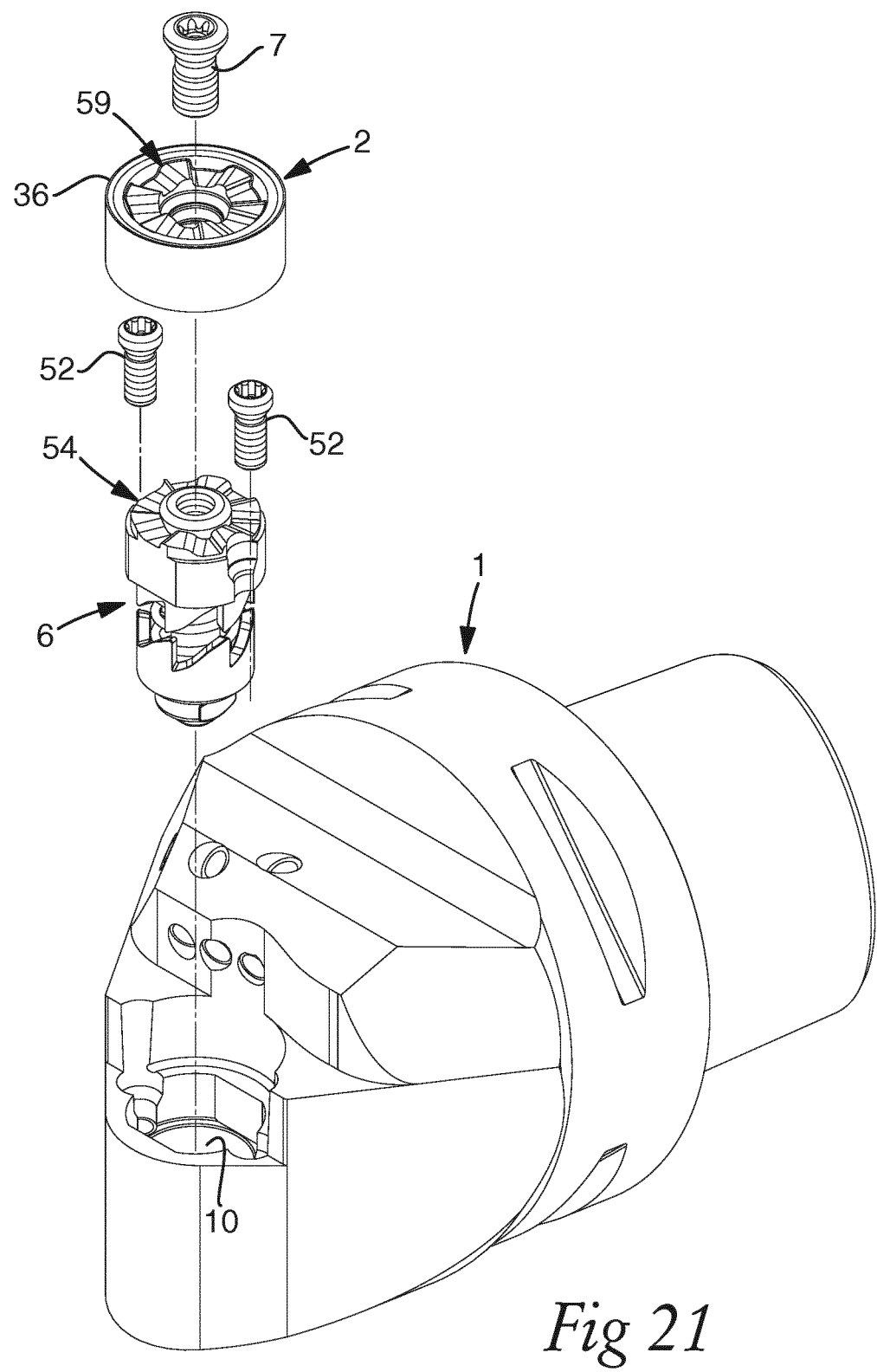

FIG. 21 is a partial exploded top view illustrating the disclosure applied to a turning tool.

DETAILED DESCRIPTION

The disclosure is shown primarily applied to a milling tool in the form of a face mill, which is illustrated in FIGS. 1-20. It is, however, also possible to use the present in another suitable chip removing tool, for example a turning tool.

Figure 1:
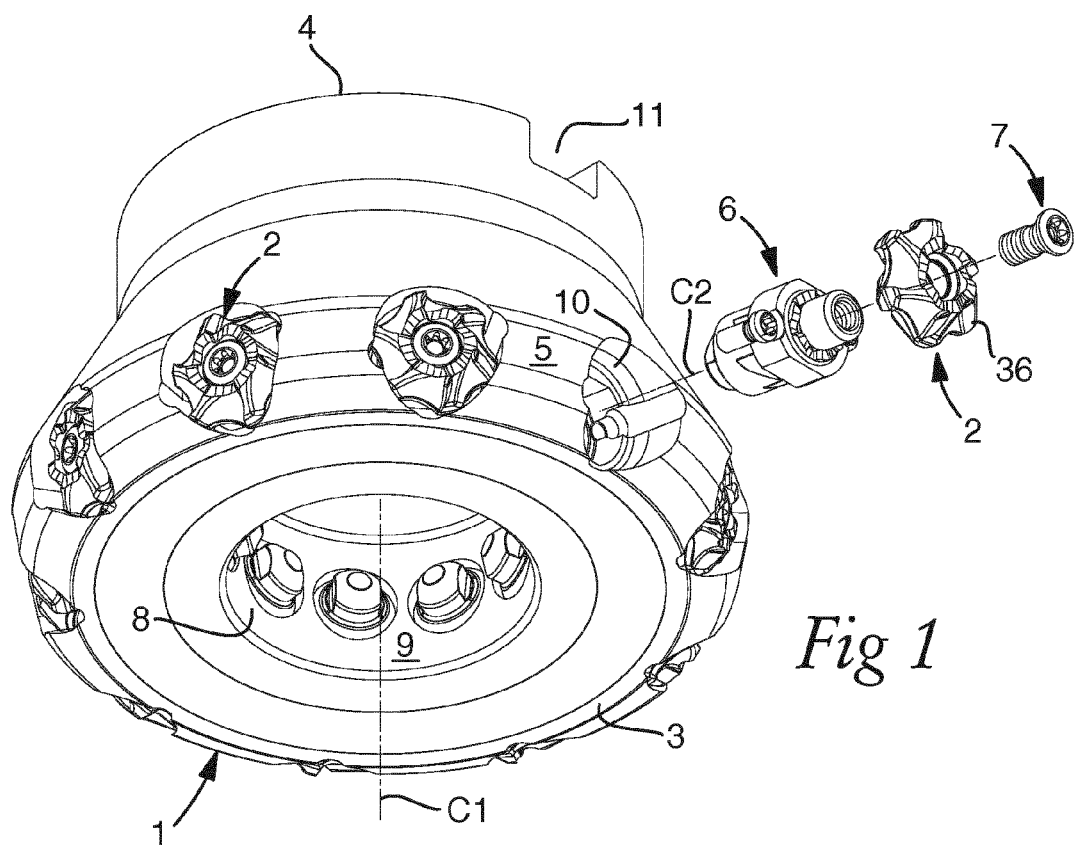
FIG. 1 is a partly exploded bottom view showing a tool according to the disclosure.

Thus, in FIG. 1, a milling cutter is shown, which includes a basic or tool body 1, and a plurality of replaceable cutting inserts 2. The basic body 1 includes a pair of opposite front and back, respectively, sides (may also be denominated front and rear ends) 3, 4 and a peripheral surface or envelope surface 5, which extends between the same. Between the front and back sides 3, 4, a center axis C1 extends, on which the tool body is rotatable. In this manner, the envelope surface 5 forms a geometrical surface of revolution on the center axis.

In the example, the number of cutting inserts 2 amounts to ten. The pitch between the cutting inserts is uniform and amounts to 36°.

In FIG. 1, one of the cutting inserts 2 is shown exploded away from the tool body 1 together with a cutting edge exchange mechanism 6, in its entirety, and a screw 7. The other nine cutting inserts are shown in positions in which they are operative and in engagement with the appurtenant seats.

The basic body 1 includes a central hollow space 8, which in the example is a through hole, i.e., a hole mouthing in the front side 3 as well as the back side 4. The hole is delimited by an internal limiting surface 9 in the form of one or more cylinder surfaces assumed to be generated by straight generatrices, which are parallel to the centre axis C1.

It should also be mentioned that a groove 11 is countersunk in the back side 4 of the basic body. Via this groove, the requisite torque can be transferred to the basic body from a driving source.

In the envelope surface 5 of the basic body, there mouth a plurality of bores 10 having the purpose of housing the cutting edge exchange mechanisms 6, as well as the appurtenant cutting inserts 2. Center axes of bores 10 are designated C2 and oriented essentially radially in relation to the center axis C1 of the basic body, more precisely so far that they radiate equiangularly from the last-mentioned one.

Figure 3:
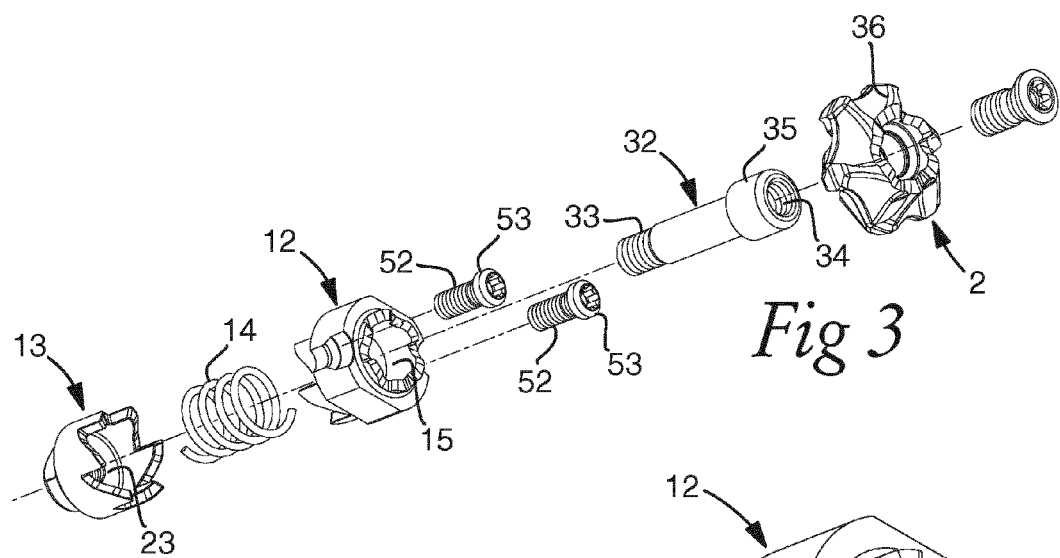
FIG. 3 is a perspective exploded view showing a cutting insert, as well as those components that are included in the cutting edge exchange mechanism according to the disclosure for the indexing of the cutting insert.
Figure 4:
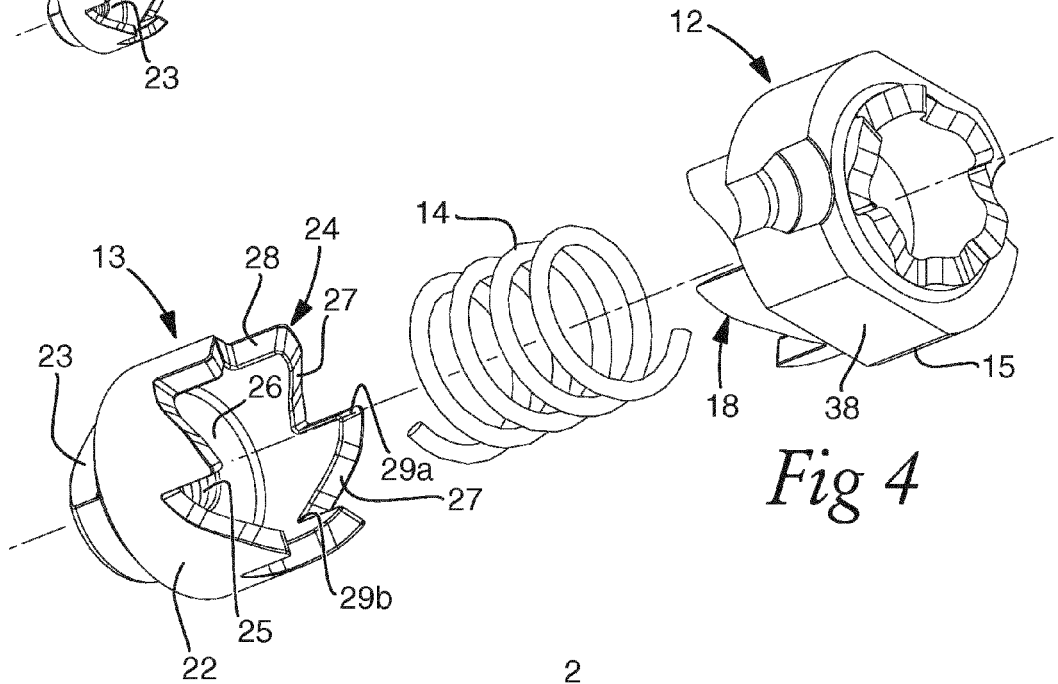
FIG. 4 is an enlarged exploded view showing a pair of sleeves included in the cutting edge exchange mechanism, viz, a radially outer sleeve and a radially inner sleeve, as well as a compression spring acting between the same.
Figure 5:
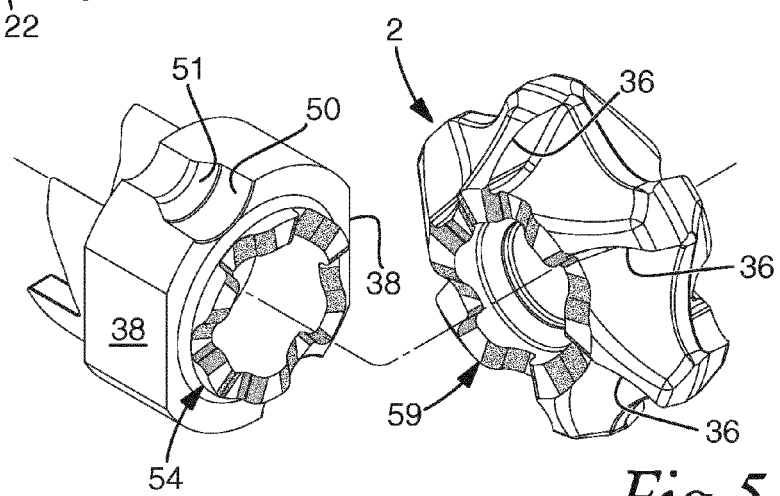
FIG. 5 is a perspective exploded view showing the cutting insert as well as the outer sleeve.
Figures 6, 7:
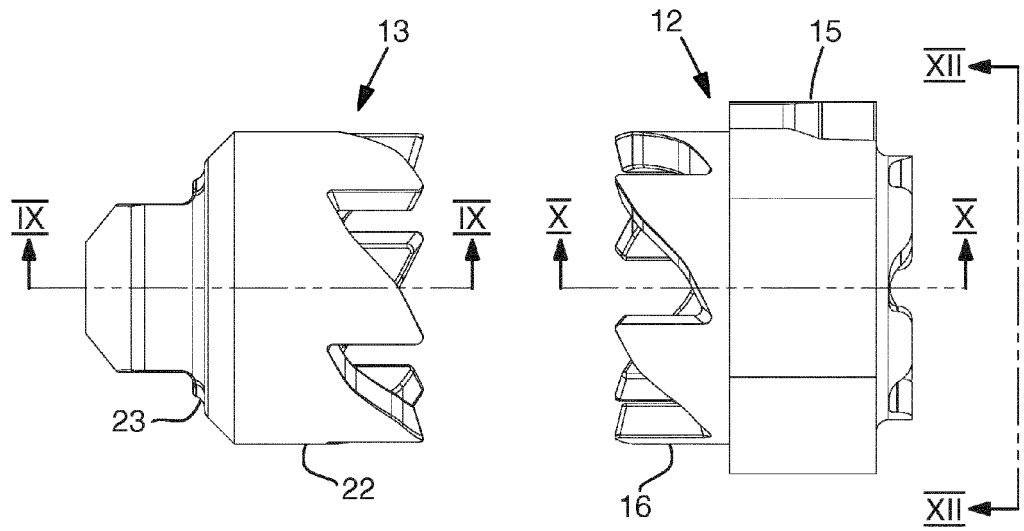
FIG. 6 is a side view of the inner sleeve.
FIG. 7 is a side view of the outer sleeve.
Figure 8:
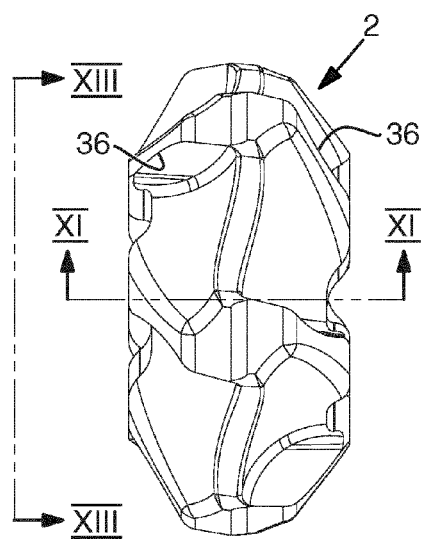
FIG. 8 is a side view of the cutting insert.

Now, reference is made to the exploded views in FIGS. 3-5, which on an enlarged scale illustrate the structure of the individual cutting edge exchange mechanism 6. Components of this mechanism include a pair of generally cylindrical sleeves, a first one of which is designated 12 and a second one 13. Between these sleeves, a compressible force generator 14 acts in the form of a mechanical compression spring, viz, a screw compression spring. Of the two sleeves, the sleeve 12 forms a radially outer sleeve in the basic body, while the sleeve 13 forms a radially inner sleeve.

The outer sleeve 12 (see FIGS. 4 and 10) includes, on one hand, a front, ring-shaped stop collar 15 for the spring 14, and, on the other hand, a rear cylinder wall 16. The stop collar 15 has an inner diameter that is smaller than the inner diameter of the cylinder wall 16. In such a way, a circumferential shoulder surface 17 is obtained, against which the outer end of the spring 14 can be urged.

In the rear cylinder wall 16, a set of teeth 18 is formed, which points rearward and each one includes, on one hand, a first, obliquely cut edge surface 19, and, on the other hand, a second edge surface 20, which is straight and is running axially in the present example. The obliquely cut edge surface 19 extends from a tooth point 21a to a bottom 21b of the individual tooth gap. The gradient of the edge surface 19 from the bottom 21b to the tooth point 21a is essentially even.

Also the inner sleeve 13 includes front and rear parts 22, 23, the front one 22 of which is a cylinder wall having teeth 24, while the rear one 23 serves as a carrier. In the rear 210 part or the carrier 23, there is included a hole 25 having a female thread. The diameter of the hole 25 is smaller than the inner diameter of the cylinder wall 22. In such a way, a ring-shaped shoulder surface 26 is formed, against which the inner end of the spring 14 can abut. Also the teeth 24 include an obliquely cut edge surface 27, and a straight, axially running edge surface 28. Each such edge surface extends between a point 29a and a tooth gap bottom 29b. It should be noted that a conical surface 31 forms a rearward tapering termination of the carrier 23.

In the cutting edge exchange mechanism 6, there is furthermore included a long narrow rod 32 (see FIG. 3), which in a rear end includes a male thread 33, and in a front end a female thread 34, which in the example is formed in a head 35. Together, the rod 32 and the carrier 23 form an ejector, which is rectilinearly movable in relation to the stop collar 15.

In the shown embodiment of the tool, the cutting inserts 2 are double-sided and formed with six alternately individually usable cutting edges 36 along each one of two opposite sides, which may be turned either outward or inward in relation to the basic body 1. For this reason, the number of teeth 18, 24 of the sleeves 12, 13 amounts to exactly six.

In the exemplified tool, the outer sleeve 12 of the cutting edge exchange mechanism 6 is fixedly anchored in relation to the basic body 1. More precisely, the sleeve 12 is rotationally secured by means of a pair of flat surfaces 38, which abut against flat surfaces 39 (see FIG. 16) in the present bore 10.

Figure 15:
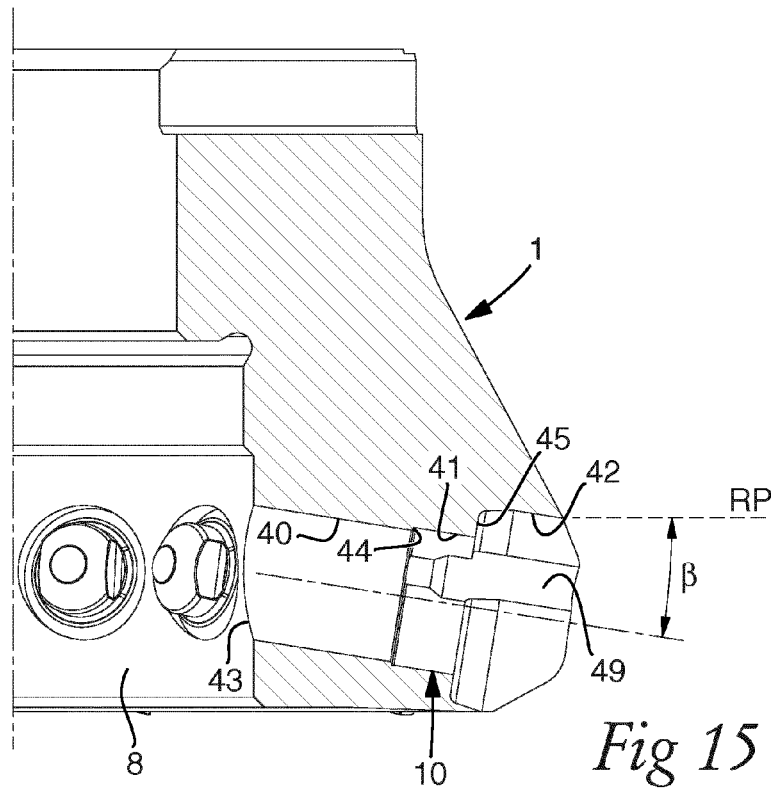
FIG. 15 is a partial cross-section through one half of the basic body of the tool, illustrating the design of an (empty) bore for the cutting edge exchange mechanism.
Figure 16:
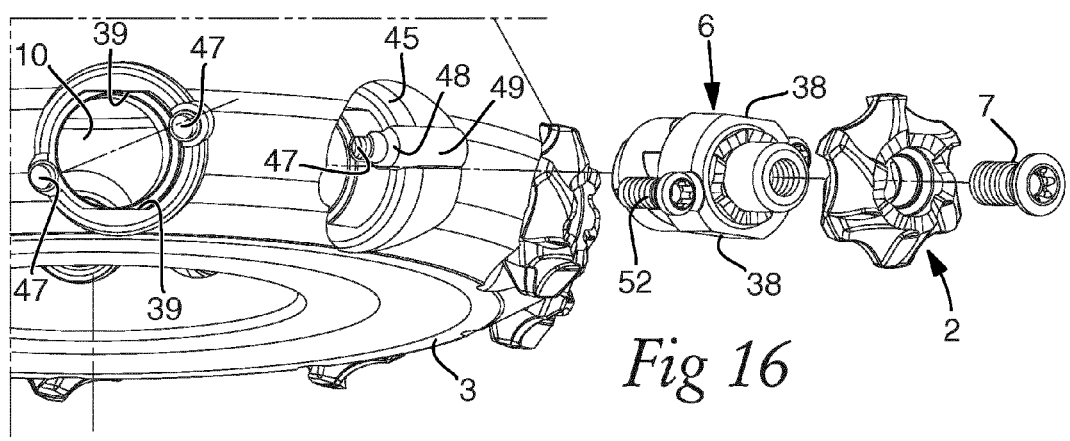
FIG. 16 is a partial perspective view showing the cutting edge exchange mechanism and the appurtenant cutting insert separated from the bore.

Before the cutting edge exchange mechanism 6 is described further, reference is made to FIGS. 15 and 16, in which it is seen that the bore generally designated as 10 includes three different, cylindrical sections 40, 41, 42 of different diameters. An inner section 40, which mouths in the inner surface 9 of the hollow space 8 via a mouth 43, has a smallest (internal) diameter. An intermediate section 41 has a somewhat greater diameter. In such a way, a ring-shaped shoulder 44, narrow per se, but still marked, is formed between the sections 40 and 41. The outermost section 42 has a considerably greater diameter than the intermediate section 41. Therefore, a comparatively wide shoulder surface 45 is formed between the sections 41 and 42. The radially external section 42 in the bore 10 has a sufficiently large radius and a sufficiently large depth to accommodate the major part of the cutting insert 2. See FIG. 17.

Figures 9, 10:
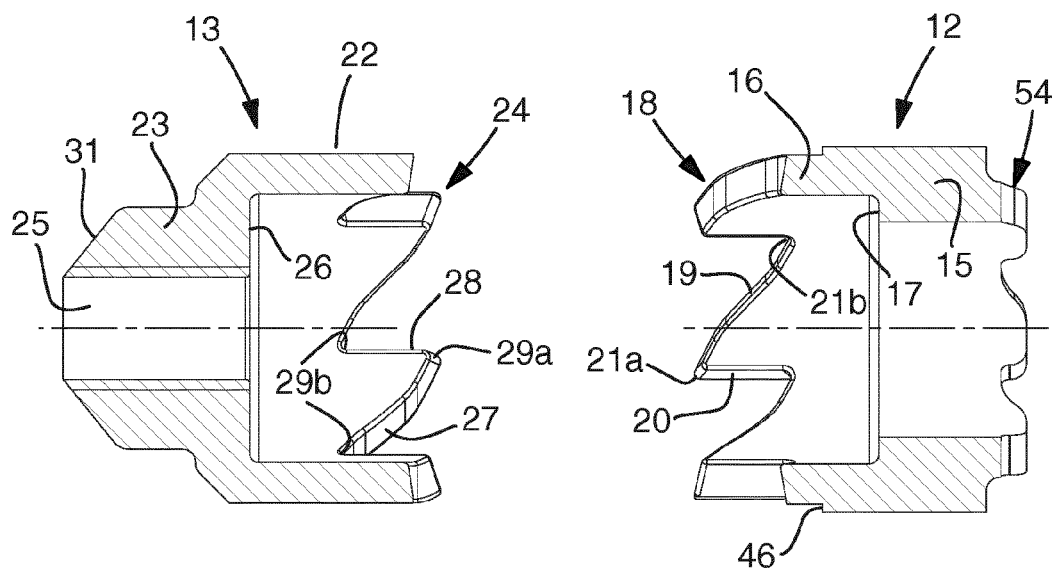
FIG. 9 is a cross-section taken along line IX-IX in FIG. 6.
FIG. 10 is a cross-section taken along line X-X in FIG. 7.
Figure 11:
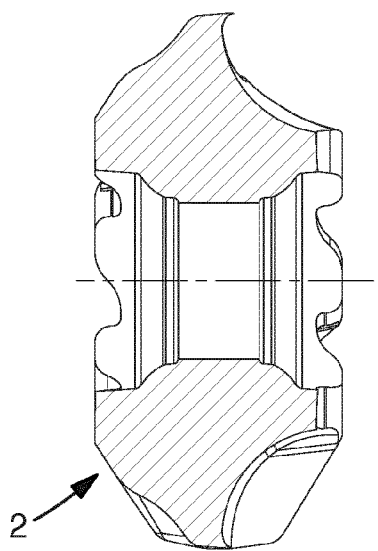
FIG. 11 is a cross-section taken along line XI-XI in FIG. 8.

As seen in FIG. 10, the sleeve 12 includes an external, narrow shoulder 46, which can be urged against the shoulder 44 when the sleeve 12 is mounted in the bore 10. In the wide shoulder surface 45 (see FIG. 16), there mouth two threaded holes 47 having a conical part surface 48, in the extension of which there extends a chute 49 (having a semi-cylindrical shape). Analogous chutes 50 as well as conical part surfaces 51 are also formed in the external, convex part surfaces of the sleeve 12 (see FIG. 5).

The two screws 52 shown in FIGS. 3 and 15, and which have conical heads 53, are arranged to be tightened in the threaded holes 47, the heads 53 being urged against the conical part surfaces 48, 51 to secure the sleeve 12 axially in the appurtenant bore 10. Simultaneously, the sleeve is rotationally secured by means of the pairs of flat surfaces 38, 39. In other words, the sleeve 12 is, in its mounted state, fixedly anchored non-axially and rotation-angularly.

The carrier 23, included in the movable sleeve 13, is in the example fixedly connected with the rod 32, more precisely via a threaded joint in the form of the male thread 33 and the female thread 25. However, other joints may be used. It is even possible to arrange the carrier 23 rotatable in relation to the rod on the assumption that the carrier is axially secured in relation to the same.

In this connection, it should be pointed out that the described cutting edge exchange mechanism is autonomous so far that the two sleeves as well as the ejector rod are manufactured in the form of an independent unit, which can be mounted in the appurtenant bore 10 (by means of the screws 52). As is described herein, however, parts of the mechanism may be integrated with the basic body as such.

Reference is now made to FIGS. 12-14, which illustrate how a seat, in its entirety designated 54, for the cutting insert 2 is formed in the outer sleeve 12, more precisely in the outside of the stop collar 15 thereof (see also FIG. 10). This seat 54 includes a plurality of male members or cogs 55, which are included in a rim and between which there are female-like recesses or gashes 56. The number of cogs and gashes, respectively, corresponds with the number of cutting edges of the cutting insert 2, i.e., in the example six. Therefore, for geometrically axiomatic reasons, the pitch angle α between the cogs amounts to 60°. The individual gash 56 is delimited by two opposite flank surfaces, viz, a flatly leaning flank surface 57 and a flank surface 58 having a relatively steeply rising flank angle. In practice, the flank angle of the surface 57 may amount to approx. 45°, while the flank angle of the surface 58 may approach 90°.

In the cutting insert 2, there is included an analogous rim 59 of cogs 60 having the same pitch angle (60°) as the cogs 55. These are separated by gashes 61, and include a flatly leaning flank surface 62 as well as a steeply rising flank surface 63. When the gear rims engage each other, the cogs do not bottom in the gashes, i.e., only the flank surfaces 57/62 and 58/63 contact each other.

A cutting insert 2 is attached to the second end of the rod 32 by a screw 7 extending through a central hole in the cutting insert 2 and being screwed in in the female thread 34 of the rod.

It should be pointed out that the individual, flat flank surface 57 and 62, respectively, occupies only a smaller part of the 60° arch that is utilized for each individual cog formation as viewed in plane elevation. In practice, the arc angle of the flat flank surface may amount to around 5°.

Figure 17:
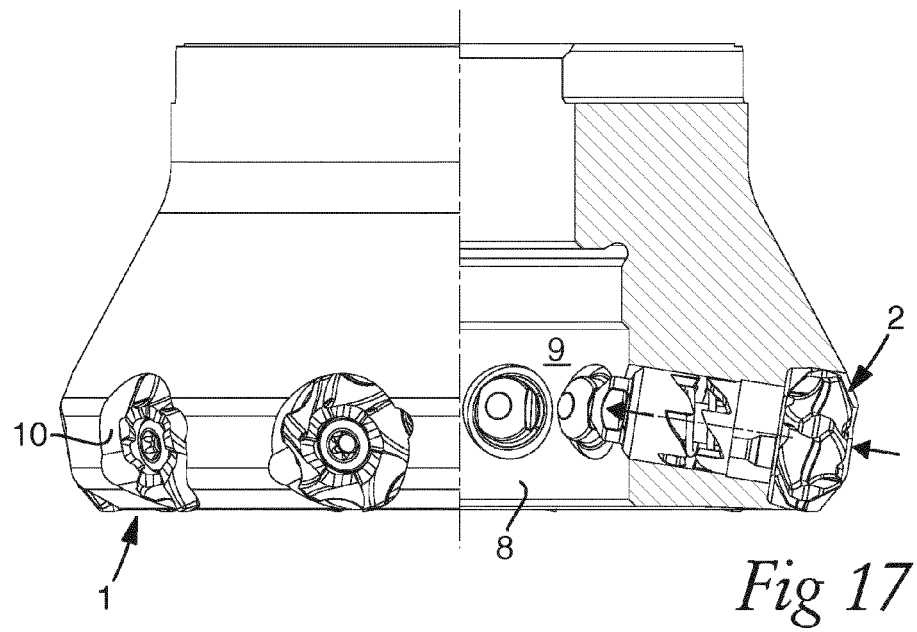
FIG. 17 is a partial cross-section side view of the basic body showing the cutting inserts in an operative state.
Figure 18:
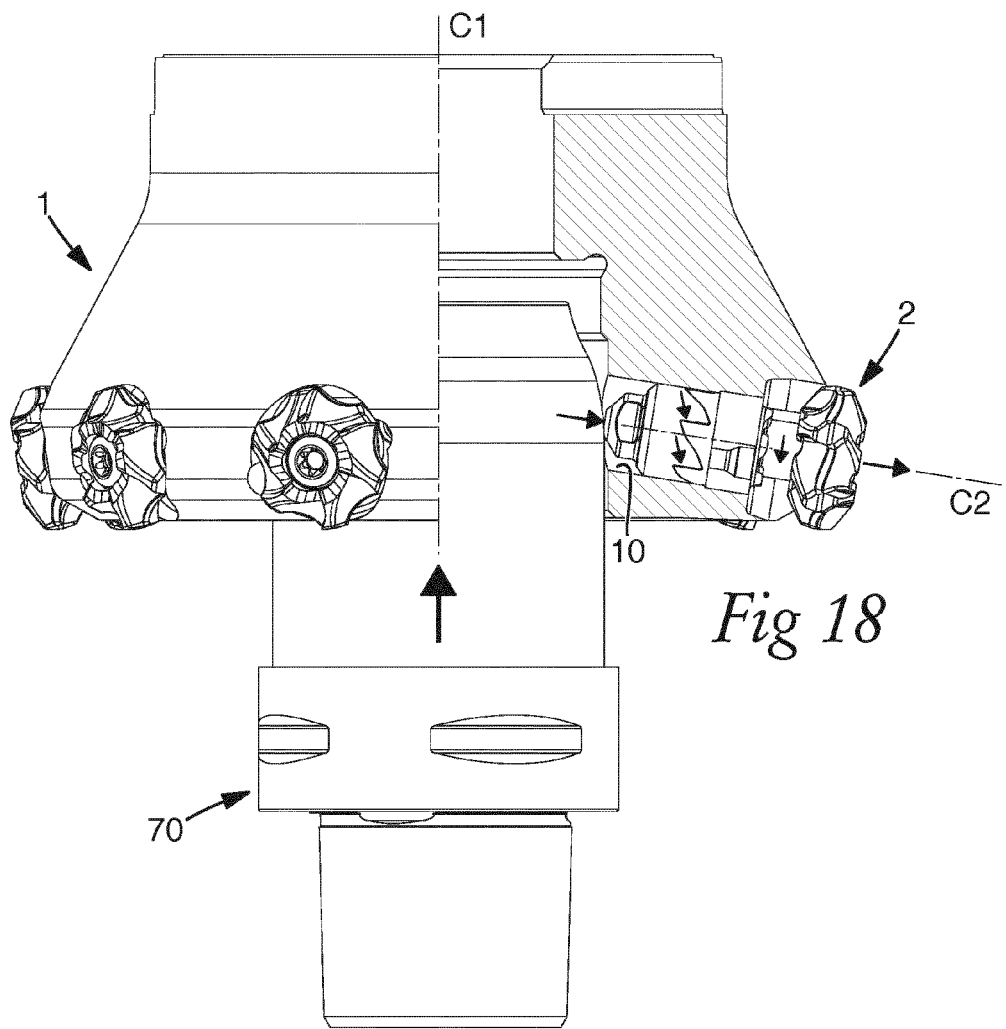
FIG. 18 is a side view corresponding to FIG. 17 showing the cutting inserts in an ejected state during indexing.
Figure 19:
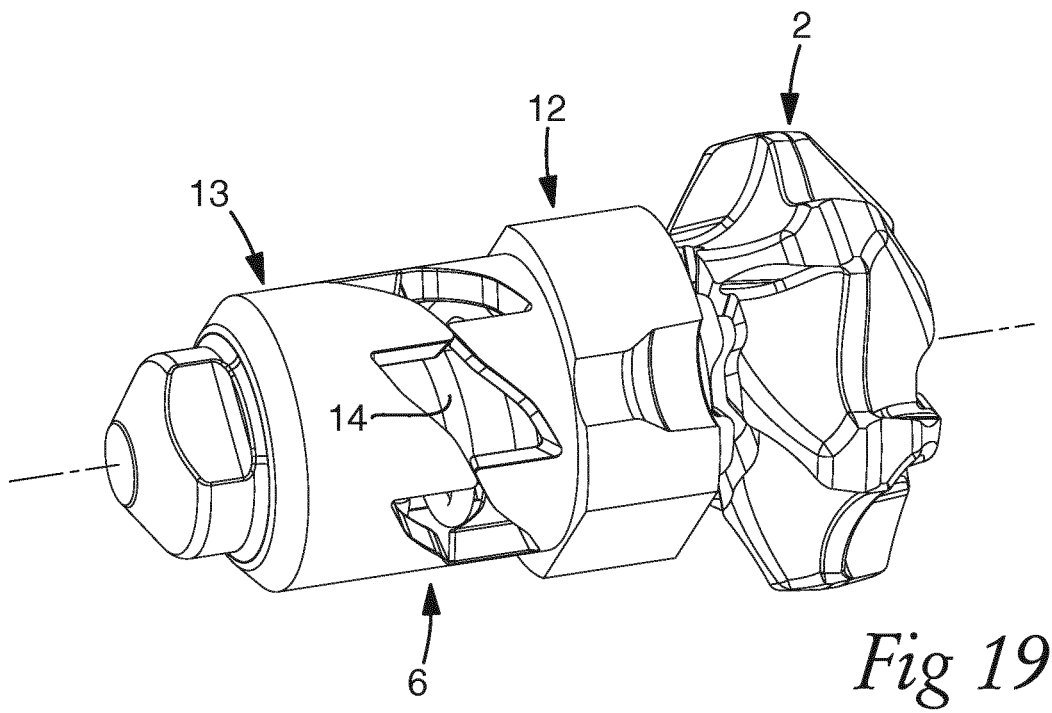
FIG. 19 is a perspective view showing the inner and outer sleeves of the cutting edge exchange mechanism in the state when the cutting insert is operative.

In FIG. 17, the cutting inserts 2 are shown in their operative positions. In this manner, the spring 14 of the individual cutting edge exchange mechanism holds the inner, movable sleeve 13 spaced apart from the fixed, outer sleeve 12. In this state, the internal gear rim 59 of the cutting insert 2 is in engagement with the outward facing gear rim 54 that forms a seat and is included in the sleeve 12. More precisely, the steep flanks 58, 63 of the cogs are in contact with each other. These are placed in such a way that they carry the cutting forces that act against the operative cutting edge of the cutting insert, whereby turning of the cutting insert is prevented.

Figure 2:
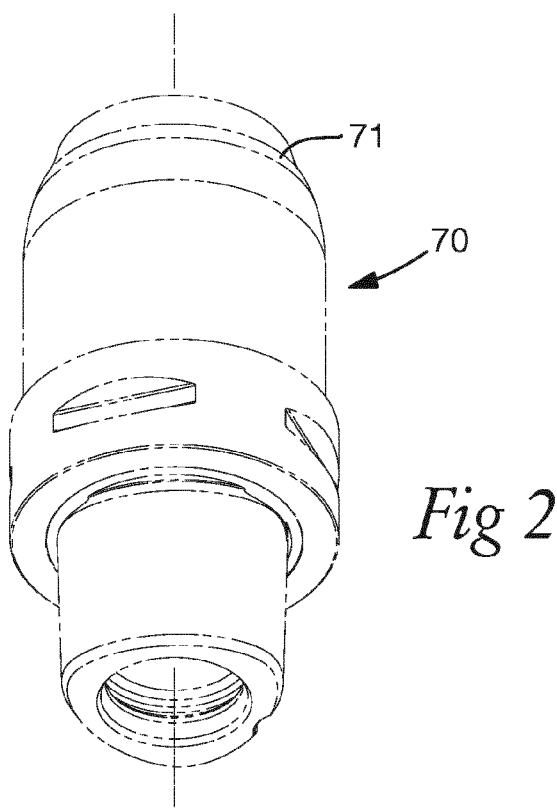
FIG. 2 is an accessory shown with dash-dotted lines in the form of a mandrel to carry out the indexing of the cutting inserts of the tool.

For indexing the cutting inserts, use is made of the mandrel 70, shown in FIG. 2, which is pressed into the hollow space 8 of the basic body in order to, via its conical surface 71, simultaneously push out all ejectors 32, more precisely against the action of the springs 14.

Figure 20A:
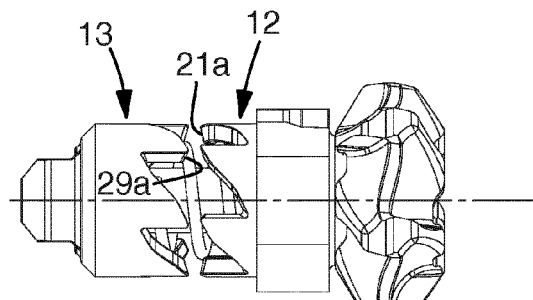
Figure 20B:
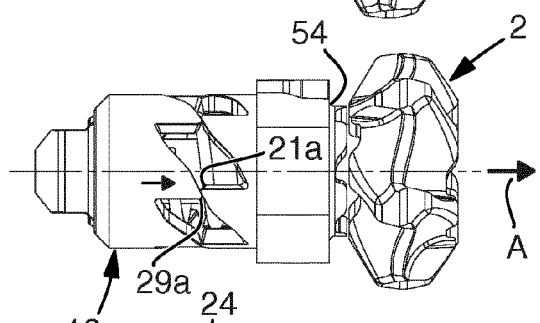

From the initial position, shown in FIG. 20a—in which the movable sleeve 13 is maximally spaced apart from the fixed sleeve 12, and the gear rim 59 of the cutting insert is in engagement with the seat 54—the cutting insert is thrust outward axially to the position according to FIG. 20b. In this position, the gear rim 59 of the cutting insert has left the seat 54, besides which the tooth points 29a included in the sleeve 13 have been brought in contact with the tooth points 21a. Now, the cutting insert is freely rotatable. Continued axial projection of the ejector 32 of the cutting edge exchange mechanism in the direction of the arrow A causes the sleeve 13, as well as the ejector 32 and the cutting insert 2, to start turning in the direction of the arrow B, more precisely by the obliquely cut edge surfaces 27 of the teeth 24 being forced to slide along the corresponding edge surfaces 19 of the teeth 18 (see also FIGS. 9 and 10).

Figure 20C:
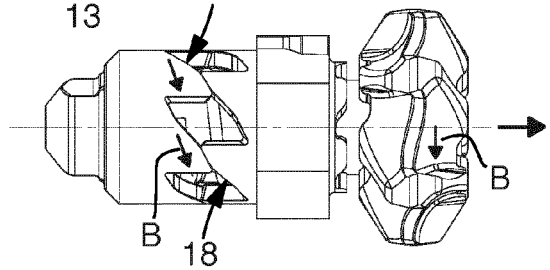
Figure 20D:
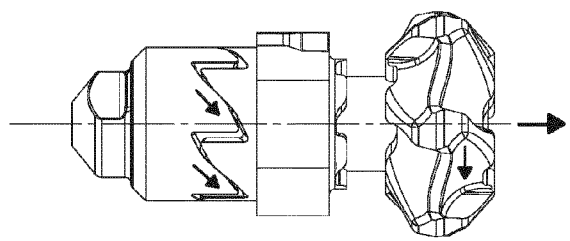
Figure 20E:
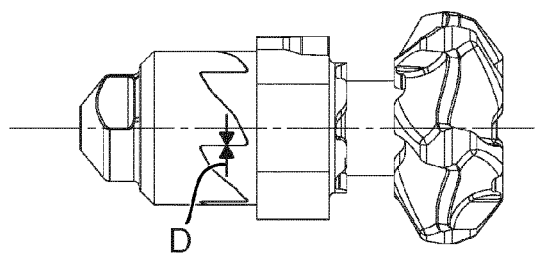
Figure 20F:
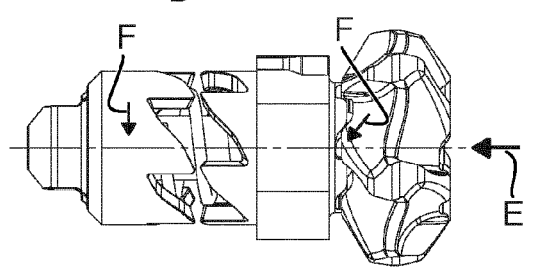

From the intermediate position according to FIG. 20c, the cutting insert is thrust outward further in the axial direction, first to the position according to FIG. 20d, and then to a position according to FIG. 20e. Herein, the cutting insert is maximally spaced apart from the sleeve 12, besides which all teeth 18 and 24, respectively, completely engage the interacting the tooth gaps. In this state, the straight edge surfaces 20 and 28 are having contact with each other, as shown by the arrows D. As a consequence of this contact, the sleeve 13 can no longer turn. A first part of the indexing operation being completed, the ejector as well as the cutting insert have turned approx. 55° from the position according to FIG. 20a to the position according to FIG. 20e (provided that the tooth points 21a, 29a should overlap each other at an arc angle of 5°).

When the cutting insert should be returned to its seat in its new indexed-up position, where it is ready for the next indexing operation, the mandrel 70 is removed from the hollow space 8. In such a way, the ejectors 32 are disengaged and subjected to the action of the springs 14. During the initial stage of this return movement, the individual ejector is given an axial movement in the direction of the arrow E only. When the cutting insert approaches the appurtenant seat, the gear rim 59 of the cutting insert begins to engage the fixed gear rim that forms the seat 54. More precisely, the cogs 60 will engage the gashes 56, and vice versa. In this connection, the flatly leaning flank surfaces 62 of the cogs 60 will encounter the corresponding flank surfaces 57 of the cogs 55, in order to, during the final stage of the return movement, slide against each other during compulsorily turning of the cutting insert as well as the ejector in the direction of the arrows F.

Accordingly, a simple and quick indexing of one or more cutting inserts, the cutting insert after indexing distinctly is fixedly pressed in the appurtenant seat by means of a compression spring, which is well protected inside the basic body. Furthermore, the cutting edge exchange mechanism made as an autonomous unit can be mounted in any tool irrespective of whether these are stationary or movable. When the mechanism is used in milling cutters equipped with numerous cutting inserts, the inner ends of the ejectors may stick inward in a hollow space common to all ejectors, from which they can be ejected in a single, centrally controlled operation, in which the cutting inserts are mass indexed.

Reference is now made to FIG. 21, which shows how the device can be applied to a tool in the form of a turning tool having only one cutting insert 2. In this case, the cutting insert is round and double-sided as well as includes a single endless cutting edge 36 along each one of the two opposite sides of the cutting insert. Also in this case, the cutting edge exchange mechanism 6 includes an ejector, which is turnable in steps to six different positions, wherein a gear rim 54 serves as a seat including six tangentially spaced-apart cogs. In an analogous way, a gear rim 59 included in the cutting insert includes six cogs. Thus, in this case, the cutting insert can be indexed to six different positions, in each one of which a sixth of the circumference of the cutting edge is utilized, i.e., a 60° arc angle.

The disclosure is not limited to the embodiments exemplified in the drawings. Thus, it is feasible to integrate the stop collar of the cutting edge exchange mechanism in the proper basic body, so far that the same is formed by a collar-shaped portion around a hole drilled in the basic body, through which the ejector of the mechanism can be moved rectilinearly back and forth. Furthermore, the compressible force generator may be other compression springs than exactly a screw compression spring, e.g., cup springs, gas springs, etc. Furthermore, the means to compulsorily turn the ejector as well as the cutting insert in connection with ejection do not necessarily need to be obliquely cut teeth in cylinder walls of the kind described. Thus, it is feasible to use thread formations having a large pitch.

The invention claimed is:

1. A cutting edge exchange mechanism for tools for chip removing machining, the cutting edge exchange mechanism comprising:
   an ejector, which, in a front part, includes an attachment for replaceable cutting inserts;

a turning device for transforming a rectilinear, axial movement of the ejector into a simultaneous turning of the same;

a fixedly anchorable stop collar, through which the ejector is movable back and forth;

a carrier included in a rear part of the ejector; and a compressible force generator disposed between the carrier and the stop collar, the force generator spacing apart the carrier from the stop collar.

2. The cutting edge exchange mechanism according to claim 1, further comprising a pair of sleeves, the stop collar being disposed in one sleeve and the carrier being disposed in another sleeve, each sleeve including a cylinder wall, each cylinder wall being radially separated from the ejector, the force generator being located between the ejector and each of the cylinder walls, wherein the turning device is included in each of the cylinder walls of the sleeves.

3. The cutting edge exchange mechanism according to claim 2, wherein the turning device comprises two sets of pointed teeth pointing at each other, a set of teeth being arranged in the cylinder wall of each sleeve, each tooth including an obliquely cut edge surface, which extends between a point and a tooth gap bottom.

4. The cutting edge exchange mechanism according to claim 3, wherein the stop collar includes a seat arranged to receive the cutting insert, the seat being a gear rim having tangentially spaced-apart cogs, each cog including a shallowly tilted flank surface and a steeply tilted flank surface, which together the shallowly and steeply tilted flank surface delimit an individual gash.

5. A cutting edge exchange mechanism according to claim 1, wherein the force generator is a mechanical compression spring.

6. A tool for chip removing machining, comprising:

a basic body;

a replaceable cutting insert; and a cutting edge exchange mechanism including an ejector, which, in a front part, includes an attachment for the replaceable cutting inserts, a turning device for transforming a rectilinear, axial movement of the ejector into a simultaneous turning of the same, a fixedly anchorable stop collar, through which the ejector is movable back and forth, a carrier included in a rear part of the ejector, and a compressible force generator disposed between the carrier and the stop collar, the force generator spacing apart carrier from the stop collar, the cutting insert being indexable by means of the cutting edge exchange mechanism.

7. The tool for chip removing machining according to claim 6, wherein the stop collar includes a seat arranged to receive the cutting insert, the seat being a gear rim having tangentially spaced-apart cogs, each cog including a shallowly tilted flank surface and a steeply tilted flank surface, which together the shallowly and steeply tilted flank surface delimit an individual gash.

8. The tool according to claim 7, wherein the cutting insert includes a second gear rim having analogous cogs arranged to engage gashes of the first gear rim.

* * * * *